US008516142B2

(12) United States Patent
Lee et al.

(10) Patent No.: US 8,516,142 B2
(45) Date of Patent: *Aug. 20, 2013

(54) METHOD FOR DELIVERY OF SOFTWARE UPGRADE NOTIFICATION TO DEVICES IN COMMUNICATION SYSTEMS

(75) Inventors: Jangwon Lee, San Diego, CA (US); An Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,367

(22) Filed: Dec. 9, 2011

(65) Prior Publication Data

US 2012/0084765 A1   Apr. 5, 2012

Related U.S. Application Data

(63) Continuation of application No. 12/953,374, filed on Nov. 23, 2010, now Pat. No. 8,112,538, which is a continuation of application No. 11/398,264, filed on Apr. 4, 2006, now Pat. No. 7,844,721.

(60) Provisional application No. 60/739,873, filed on Nov. 23, 2005.

(51) Int. Cl.
    *G06F 15/16*          (2006.01)

(52) U.S. Cl.
    USPC ........................................... 709/230

(58) Field of Classification Search
    USPC ................... 717/168; 709/224, 230, 235
    See application file for complete search history.

(56) References Cited

U.S. PATENT DOCUMENTS

| 6,269,080 | B1 | 7/2001 | Kumar |
| 7,844,721 | B2 | 11/2010 | Lee et al. |
| 8,112,538 | B2 | 2/2012 | Lee et al. |
| 2004/0117785 | A1 | 6/2004 | Kincaid |
| 2007/0169073 | A1 | 7/2007 | O'Neill et al. |

FOREIGN PATENT DOCUMENTS

| EP | 0804045 A2 | 10/1997 |
| EP | 0959635 A1 | 11/1999 |
| EP | 1429569 A1 | 6/2004 |
| KR | 20020030432 | 4/2002 |
| RU | 2196393 | 1/2003 |
| WO | WO2005001665 A2 | 1/2005 |
| WO | WO2005062642 A1 | 7/2005 |

OTHER PUBLICATIONS

International Preliminary Report on Patentability-PCT/US06/061218, International Search Authority—European Patent Office—Apr. 21, 2008.
International Search Report—PCT/US06/061218—International Search Authority—European Patent Office—Nov. 16, 2007 (060060WO).
Written Opinion—PCT/US06/061218, International Search Authority—European Patent Office—Nov. 16, 2007.

*Primary Examiner* — Larry Donaghue
*Assistant Examiner* — Marshall McCleod
(74) *Attorney, Agent, or Firm* — The Marbury Law Group, PLLC

(57) ABSTRACT

Systems and methodologies are described that facilitate providing software upgrade notifications to user devices that utilize unicast and multicast communication techniques in a wireless communication environment. Bandwidth and power consumption is minimized by permitting determination to be made regarding whether a given software update is relevant to the user device prior to attempting a download or receiving a notification thereof. Additionally, evaluation of version number and software identity facilitates determining whether to employ a unicast software check-up protocol or a multicast software check-up protocol. Software upgrade information may also be transmitted over a multicast channel for a predetermined time period, after which a user device may initiate a unicast check-up protocol to receive software upgrade information.

32 Claims, 12 Drawing Sheets

METHOD FOR DELIVERY OF SOFTWARE UPGRADE NOTIFICATION TO DEVICES IN COMMUNICATION SYSTEMS

CROSS-REFERENCE TO RELATED APPLICATIONS

This application is a continuation of U.S. patent application Ser. No. 12/953,374, entitled "METHOD FOR DELIVERY OF SOFTWARE UPGRADE NOTIFICATION TO DEVICES IN COMMUNICATION SYSTEMS," filed Nov. 23, 2010, which is a continuation of U.S. patent application Ser. No. 11/398,264, entitled "METHOD FOR DELIVERY OF SOFTWARE UPGRADE NOTIFICATION TO DEVICES IN COMMUNICATION SYSTEMS," filed Apr. 4, 2006, now U.S. Pat. No. 7,844,721, which claims the benefit of U.S. Provisional Application Ser. No. 60/739,873, entitled "METHODS AND APPARATUS DELIVERY OF SOFTWARE UPGRADE NOTIFICATION TO DEVICES IN COMMUNICATION SYSTEMS," filed Nov. 23, 2005, all of which are assigned to the assignee hereof, and the entirety of which is incorporated herein by reference.

BACKGROUND

I. Field

The following description relates generally to wireless communications, and more particularly to facilitating software upgrade notification for devices that employ unicast and multicast networks in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations.

Software upgrade checks may be performed in wired communication environments, for instance, upon a launch of the software application, or by user initiation, such as when the application establishes a unicast connection to the designated server and checks whether there is any software upgrade available. Today's mobile devices, however, are capable of downloading software over a wireless network, such that they need not be hard wired to a system for software upgrade notification. Thus, there exists a need in the art for a system and/or methodology of improving throughput in such wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Various aspects presented herein relate to providing software upgrade notification for an application in a device that utilizes multicast (broadcast) and unicast networks. These two types of networks (multicast and unicast) may be wired or wireless. An example of such application is forward-link-only (FLO) system which has two types of networks available: (1) FLO as a multicast (broadcast) network and (2) CDMA 1xEV-DO as a unicast network. Typically, software upgrade does not occur frequently; however, devices nevertheless need to keep up-to-date for software upgrades because software may be upgraded for critical reasons, such as feature enhancements, bug fixes, security breaches, etc. The aspects presented herein may be applied to any type of frequent, infrequent and/or critical information delivery to devices in wireless networks. Various aspects facilitate to minimizing consumed resources and server loads, quickly delivering software upgrade notifications to devices, such a device can be up-to-date for software upgrade notifications whenever the device is connected to the network.

According to an aspect, a method of providing software upgrade notification in a wireless communication environment may comprise receiving software version information from a server, performing a check-up protocol to determine whether a software upgrade is available for a user device, and performing an access protocol to receive a software upgrade notification. The method may additionally comprise transmitting a software upgrade notification over a multicast channel. The check-up protocol may be a "push" check-up protocol performed over a multicast connection between a server and at least one user device, which may comprise receiving the software version information over a multicast data channel, and evaluating whether a software ID received with the version information corresponds to the user device to determine whether the received software version information is relevant to the user device. The check-up protocol may also be a "pull" check-up protocol, comprising generating a point-to-point connection between the user device, requesting the software upgrade information from the server, receiving a server response comprising the software version information, and receiving a software upgrade notification if a version number in the server response is greater than a version number associated with software stored on the user device. The method may further comprise employing a token-based access protocol and determining whether a client token is valid in the user device, performing a pull check-up protocol, creating a client token, and setting the client token value equal to a server token value if the client value is not valid, and determining whether a client token value is greater than or equal to a server token value (modulo n), if the client token is valid. Still furthermore, the method may comprise determining whether the client token value is between the server token value minus m (modulo n), where the server transmits software upgrade notifications associated with m (positive integer) most recent server token values, and the server token value −1 (modulo n), where n is a maximum token value, if the client token value is not greater than or equal to the server token value (modulo n). The method may additionally comprise performing a push check-up protocol and setting the client token value equal to the server token value if the client token value is between the server token value minus m (modulo n) and the server token value −1 (modulo n), and performing a pull check-up protocol and setting the client token value equal to the server token value if the client token value is not between the server token value minus m (modulo n) and the server token value −1 (modulo n).

According to another aspect, an apparatus that facilitates providing software upgrade notifications to user devices that communicate over multicast and unicast connections in a wireless communication environment may comprise a receiver that receives software version information, and a processor that performs a check-up protocol and an access protocol to obtain a software upgrade notification. The processor may perform either or both of a push and pull check-up protocol, as described above with regard to the method. For instance, the processor may determine whether a client token is valid in the user device, may compare the client token value to a server token value, etc., to determine which check-up protocol to utilize. Additionally, the software upgrade notification may be performed using a push check-up protocol for a predetermined time period, followed by a pull check-up protocol.

According to another aspect, a wireless communication apparatus may comprise means for receiving software version information from a server over both a multicast and a unicast connection, means for performing a check-up protocol to determine whether a software upgrade is available for a user device, and means for performing an access protocol to receive a software upgrade notification. The apparatus may further comprise means for employing a token-based access protocol and determining whether a client token is valid in the user device, means for performing a unicast check-up protocol, and means for creating a client token, and means for setting the client token value equal to a server token value if the client value is not valid. The apparatus may still further comprise means for determining whether a client token value is greater than or equal to a server token value (modulo n), if the client token is valid; means for determining whether the client token value is between the server token value minus m (modulo n), where the server transmits software upgrade notifications associated with m (positive integer) most recent server token values, and the server token value −1 (modulo n), where n is a maximum token value, if the client token value is not greater than or equal to the server token value (modulo n); means for performing a multicast check-up protocol and means for setting the client token value equal to the server token value if the client token value is between the server token value minus m (modulo n) and the server token value −1 (modulo n); and means for performing a unicast check-up protocol and means for setting the client token value equal to the server token value if the client token value is not between the server token value minus m (modulo n) and the server token value −1 (modulo n). Still further more, the apparatus may comprise means for providing the software upgrade notification by employing means for performing a multicast check-up protocol for a predetermined time period, followed by means for executing a unicast check-up protocol.

Yet another aspect relates to a computer-readable medium having a computer program comprising computer-executable instructions for receiving an overhead message comprising software version information from a server; performing a check-up protocol to determine whether a software upgrade is available for a user device, and performing an access protocol to receive a software upgrade notification. The check-up protocol may be a multicast check-up protocol and/or a unicast check-up protocol. The computer-readable medium may further have instructions for determining which check-up protocol to execute, including instructions for analyzing a client token value and comparing the client token value to a server token value.

A further aspect relates to a processor that executes instructions for increasing throughput in a wireless communication environment, the instructions comprising: receiving an overhead message with software version information from a server; performing a check-up protocol to determine whether a software upgrade is available for a user device; and performing an access protocol to receive a software upgrade notification. The check-up protocol may be either or both of a multicast check-up protocol and a unicast check-up protocol, as determined by as series of determinations regarding client token value and server token value. Additionally, software upgrade notifications may be provided to a user device using a multicast protocol for a predetermined time period, after which the user device may initiate a unicast protocol to obtain upgrade notification information.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
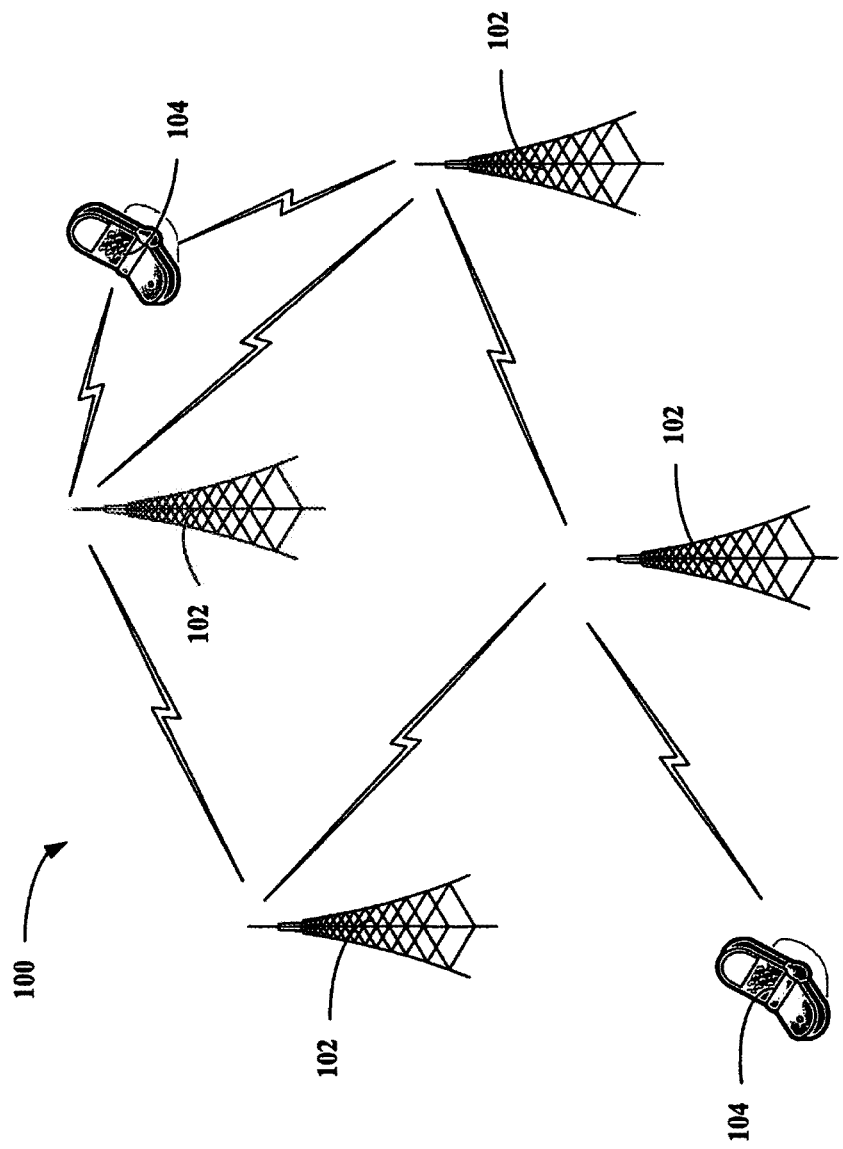
FIG. 1 illustrates a wireless network communication system in accordance with various aspects presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term machine-readable medium" can include, without being limited to, wireless channels and various other media capable of storing, containing, and/or carrying instruction(s) and/or data.

Referring now to FIG. 1, a wireless network communication system 100 is illustrated in accordance with various embodiments presented herein. System 100 can comprise one or more base stations 102 in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless network 100. System 100 can be employed in conjunction with various aspects described herein in order facilitate notifying user devices of a software upgrade in a wireless communication environment, as set forth with regard to subsequent figures.

In accordance with various aspects presented herein, the following example relates to a scenario in which a large number of user devices employ a software upgrade notification application and desire update notifications for a large number of software classes. Let a software version comprise two components, X and Y, such that the class of software is described as SOFTWARE_ID (X), and a sequence number of the software is defined by (Y). There may be multiple classes of software of the application depending on different operating system (OS) types, different network providers, and different device types. Thus, X can comprise any level of hierarchy, such as, for example, X=a.b.c, where "a" is an OS_type ID, "b" is network provider ID, and "c" is device type ID. The sequence number (Y) (e.g., "Version 3, Version 5.2, etc.) is incremented whenever there is new software available for a given SOFTWARE_ID.

For software upgrade notification, two design factors may be considered from a device perspective, namely: (1) the manner in which to obtain the information, and (2) the time at which to obtain the information. The manner in which upgrade information is obtained relates to execution of a "check-up" protocol, and the timing thereof relates to execution of an access protocol. As described herein one or more check-up protocols may be combined with any of a plurality of access protocols. In this manner, the systems and methods presented herein can conserve network resources by reducing a need for long-duration bandwidth-consuming software upgrade broadcasts, while still facilitating providing software upgrades to user devices on the network.

Referring to FIGS. 2-5, methodologies relating to notifying a user device of a software upgrade are illustrated. The methodologies described herein may be performed in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 2:
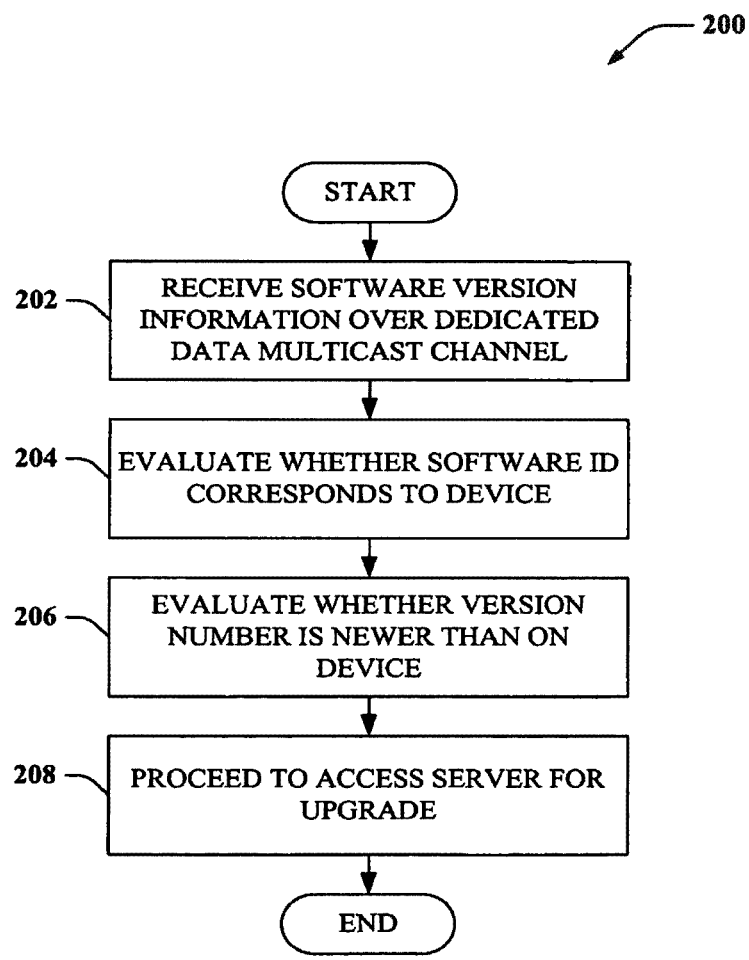
FIG. 2 is an illustration of a methodology for performing a "push" check-up protocol to determine whether a software upgrade is available for a user device in a wireless communication environment, in accordance with one or more aspects.

FIG. 2 is an illustration of a methodology 200 for performing a "push" check-up protocol to determine whether a software upgrade is available for a user device in a wireless communication environment, in accordance with one or more aspects. As used herein, "upgrade" and "update" are intended to be synonymous and interchangeable terms that denote a newer version of a particular piece of software than is presently resident on the user device. "Push" is intended to describe a "one-to-many," or multicast broadcast system. Thus, the push mechanism utilizes a broadcast (multicast) network wherein information is pushed from a server to a plurality of devices. In "pull" mechanism (e.g., such as is described in detail below, with regard to FIG. 3), a device individually initiates point-to-point communication with the server, and the server responds to it using the unicast network (e.g., the device "pulls" information from the server).

According to method 200, a user device may receive software version information from a server over a dedicated multicast data channel, at 202. A server may continuously transmit a most recent sequence number for a software version for the entirety of software classes on the data channel. SOFTWARE_ID may be utilized to delineate a scope of the sequence and/or version information according to various aspects. For example, SOFTWARE_ID may be employed as an "address" of the message, and the device only receives a message "addressed" to its particular SOFTWARE_ID. Thus, a device with a particular SOFTWARE_ID tunes in to the data channel and evaluates a signal thereon until it finds the latest sequence number corresponding to its SOFTWARE_ID, at 204. At 206, a determination is made regarding whether the latest sequence number advertised in data channel is larger than that of the device's current software sequence number. If so, then a software upgrade notification should be delivered to the user device. At 208, the user device may proceed to execute an access protocol to obtain the software upgrade.

Figure 3:
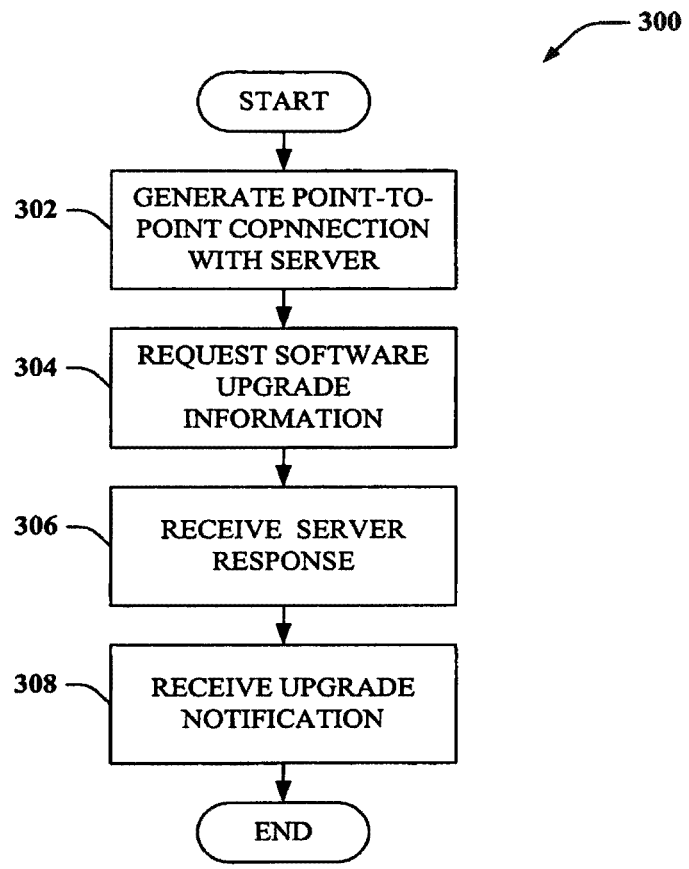
FIG. 3 is an illustration of a method of performing a "pull" check-up protocol to determine whether a software upgrade is available for a user device in a wireless communication environment, in accordance with one or more aspects.

FIG. 3 is an illustration of a method 300 of performing a "pull" check-up protocol to determine whether a software upgrade is available for a user device in a wireless communication environment, in accordance with one or more aspects. A pull checkup protocol comprises a point-to-point communication link between a server and a user device. The device may individually create a point-to-point (unicast) connection to the server at 302. The device may send a request message for software upgrade information, at 304, to "pull" such information from the server. The request message may contain the device's SOFTWARE_ID and a sequence number indicating the most recent software version on the device. At 306, the device may receive a response message form the server. According to one aspect, the response message may comprise the latest sequence number associated with the particular software application for the SOFTWARE_ID provided by the device at 304. In such a case, the device may determine whether it needs a software upgrade or not (e.g., by determining whether the sequence number received in the response message is greater than the sequence number of the device's current software). According to another aspect, the server may determine whether the latest software sequence number is greater than the device's indicated sequence number, and may send the software upgrade notification in the response message at 306 (e.g., "upgrade necessary" or "no upgrade necessary" or the like). In either case, at 308, the device may receive an upgrade notification.

Methods 200 and 300 may be combined with any of a plurality of access methods. For instance, a periodic access method may be employed, wherein the device periodically checks whether a software upgrade is available. For each software class, a checkup period (e.g., 1 day, 5 days, 7 days, 30 days, etc.) will be associated, which may be different for different software classes. According to another access method, the device may check for an upgrade upon every launch of the application. According to yet another aspect, a user may be permitted to initiate a software checkup. Still another aspect relates to a transaction-based access protocol, whereby the device performs a check-up protocol upon a transaction between the device and the server. A further aspect relates to a "token" access method, which employs a dedicated multicast channel, called an "overhead" channel, to convey up-to-date system state information, described in greater detail below at FIG. 4.

Figure 4:
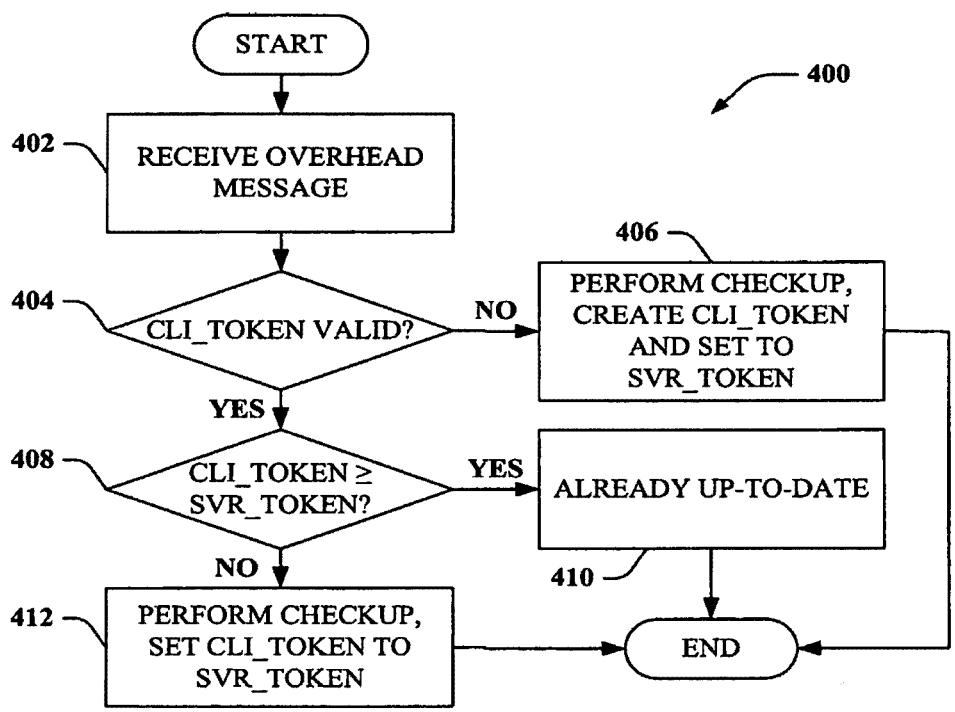
FIG. 4 is an illustration of a method that facilitates permitting a user device to receive a software upgrade notification, in accordance with one or more aspects.

FIG. 4 is an illustration of a method 400 that facilitates permitting a user device to receive a software upgrade notification, in accordance with one or more aspects. Method 400 is a token-based approach wherein a client token value is compared to a server token value, which is periodically advertised in a multicast channel. At 402, a device may tune in to an overhead channel over which a server continuously transmits overhead information, which may include a latest software version or sequence number, device ID information, etc, and receive an overhead message. The device may tune in to the overhead channel periodically. In contrast with other data channels, the overhead channel contains smaller amounts of, but critical, information for the operation of the application. Thus, the resources needed by a user device for tuning in to this channel and reading the overhead message are relatively few from the perspective of the device. At 404, a determination may be made regarding whether a client token (CLI_TOKEN) is present. According to an aspect, the device locally maintains an integer CLI_TOKEN value (e.g., a 1-byte integer value or some other suitable value). Initially, CLI_TOKEN is not present: however, upon receiving the overhead message, if the CLI_TOKEN is not present in the device as determined at 404, then the device performs the check-up for the software upgrade, at 406. Also at 406, the device may create a CLI_TOKEN and set it equal to the SVR_TOKEN in the overhead channel.

The server maintains an integer SVR_TOKEN value (e.g., 1 byte, or some other suitable value). According to a 1-byte example without being limited thereto, The SVR_TOKEN value may be incremented by 1 modulo 256 from 0, upon release of new software upgrades. The SVR_TOKEN value may be continuously advertised in the OVERHEAD channel. If CLI_TOKEN is present at 404, then at 408 a determination may be made regarding whether CLI_TOKEN is equal to SVR_TOKEN. If CLI_TOKEN value is less than the SVR_TOKEN value, the device performs the check-up for the software upgrade, and the CLI_TOKEN value is set to SVR_TOKEN value, at 412. If the CLI_TOKEN value is greater than or equal to the SVR_TOKEN value, then the device has the latest software version and no update is necessary, as indicated at 410. Additionally, SVR_TOKEN may wrap around after 256 increments. Thus, the CLI_TOKEN value may be equal to SVR_TOKEN wrapped-around, such as when the device has been out-of-network for a long time. To handle this scenario, the stored CLI_TOKEN may be erased if overhead messages have not been acquired for some predefined time period (e.g., 30 days, 45 days, 90 days, etc.). This duration may be set to be substantially shorter than an estimated period required for SVR_TOKEN wrap-around.

Figure 5:
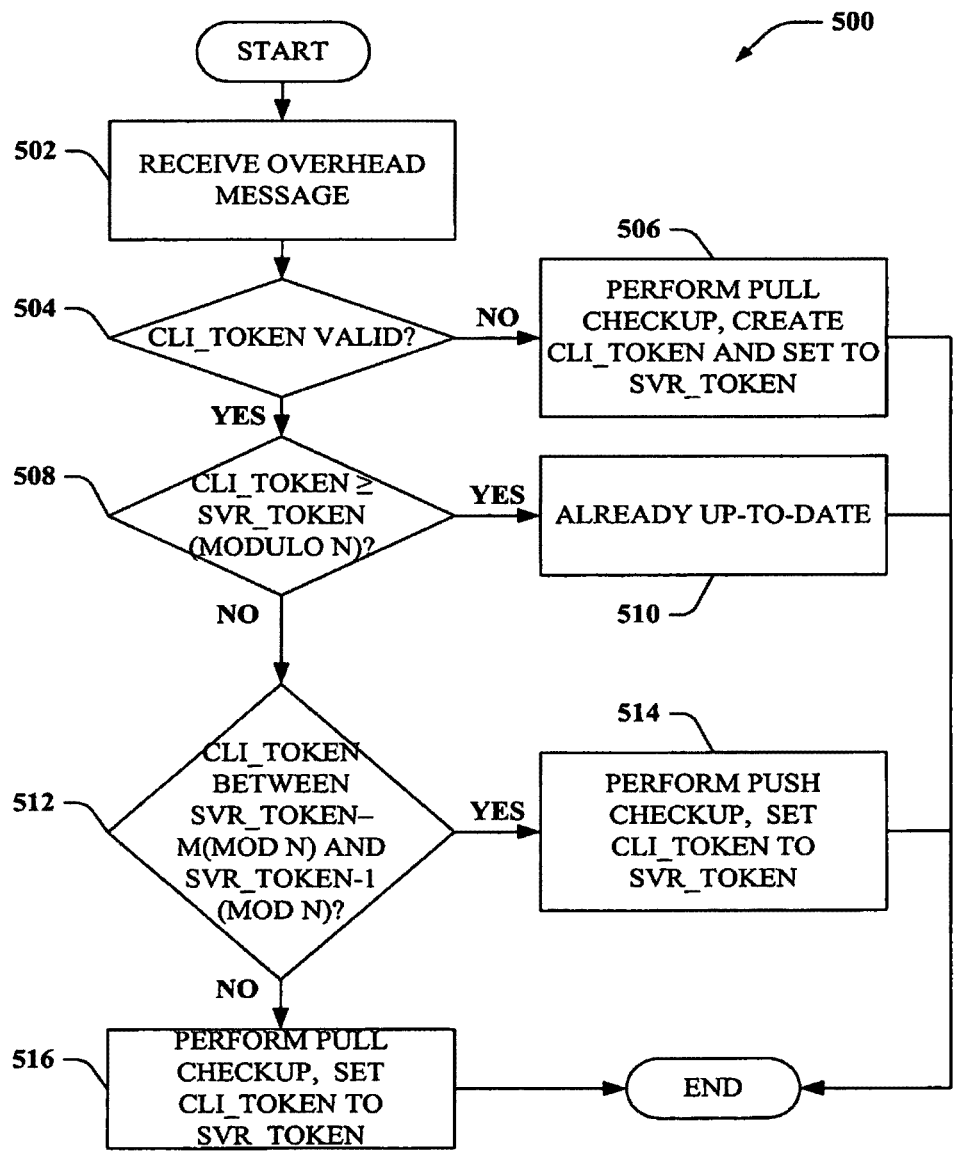
FIG. 5 illustrates methodology that facilitates performing a token access protocol in combination with each of a push check-up method and a pull check-up protocol, in accordance with various aspects.

FIG. 5 illustrates methodology 500 that facilitates performing a token access protocol in combination with each of a push check-up method and a pull check-up protocol, in accordance with various aspects. Similar to method 400, method 500 also utilizes a token-based protocol wherein a client token value is compared to a server token value that is periodically advertised in a multicast channel. For example, rather than sending all the latest sequence numbers for the entire software classes as described above, a server may send incremental change information between two SVR_TOKENs in a data channel. For instance, in a case where there are two new upgrades for software class A and B with SVR_TOKEN=3, the server may increment its SVR_TOKEN (e.g., to 4) and advertise the SVR_TOKEN in an overhead channel, (e.g., in a manner similar to that described above, with regard to FIG. 3). Then, the server may send two software upgrade notification messages in the data channel The format of the message may comprise a plurality fields. For instance, "SVR_TOKEN" may comprise a value associated with a software upgrade. "NUM_RECORD" may define a number software upgrade notifications added in a given SVR_TOKEN. "RECORD_ID" may be uniquely assigned among NUM_RECORD software upgrade notifications. "SOFTWARE_ID" may be defined as described above. "LATEST_SQN_NUM" may define a latest sequence number for the SOFTWARE_ID. By utilizing the NUM_RECORD and RECORD_ID of each message, the device can determine how many software upgrade notifications to collect and when to stop looking for upgrade notifications.

Accordingly, method 500 begins at 502, where a user device may receive an overhead message. At 504, a determination may be made regarding whether a CLI_TOKEN exists. If not, then a pull checkup protocol may be performed and the CLI_TOKEN may be created and set equal to the SVR_TOKEN, at 506. If a client token is valid at 504, then at 508, a determination may be made regarding whether the client token value is greater than or equal to the server token value (modulo n), where n is a maximum token number. If the client token value is greater than or equal to the server token value, then no action need be taken, as indicated at 510, because the device is up to date and has the latest version of the software in question.

If the client token value is less than the server token value, then at 512, a determination may be made regarding whether the client token value is between the server token value=m (modulo n), where the server transmits software upgrade notifications associated with m (positive integer) most recent server token values, and the server token value −1 (modulo n), if the client token value is not greater than or equal to the server token value (modulo n) (e.g., to address the scenario wherein the server token value wraps around from the maximum value, n, to zero). For instance, a server may continuously and/or periodically transmit software upgrade notifications associated with m most recent token values. For example m may be a preset number, such as 3, such that the server continuously and/or periodically transmits the software upgrade notifications associated with 3 most recent server token values. Additionally or alternatively, m may be dynamically defined and be included in the overhead message. According to another example, in a scenario in which n is an integer value expressed by a single byte (e.g., an 8-bit value), n may have a maximum value of 255, and a wrap-around condition may arise when the client value reaches 255 and the server token has wrapped around to 0 (e.g., or some other value less than 255). In such a scenario, the client token value may appear to be greater than the server token value, even though the client device is eligible for a software upgrade notification. To mitigate the wrap-around problem, if a server transmits multicast software upgrade notifications that are associated with a number of upgrades in the range of SVR_TOKEN−m (modulo 255) through SVR_TOKEN−1 (modulo 255) (e.g., a most recent server token), then a criterion may be imposed to ensure that the client token value falls between the values "SVR_TOKEN−m (modulo 255)" and "SVR_TOKEN−1 (modulo 255)", prior to initiating a push check-up protocol. It will be appreciated that the foregoing example is illustrative in nature and is intended to facilitate understanding of the mechanism by which a wrap-around condition is addressed, and that n may be any suitable integer (e.g., 512, 1000, 1024,) and is not limited to the 255 value associated with a maximum single-byte integer value.

If the condition is true at 512, then at 514 a push check-up protocol may be implemented, after which the client token value may be set equal to the server token value. If the condition is not true at 512, then at 516, a pull check-up protocol may be implemented, after which the client token value may be set equal to the server token value. As with method 400, a stored client token may be erased if overhead messages have not been acquired for some predefined time period (e.g., 15 days, 31 days, 60 days, etc.). This duration may be set to be substantially shorter than an estimated period required for SVR_TOKEN wrap-around.

The following discussion presents several variations to methods 400 and 500. For instance, the server may stop sending incremental software upgrade information in the data channel after a predefined time period. In this case, the device may utilize a pull check-up method if it cannot collect the software upgrade notifications in the data channel. According to another example, rather than sending incremental change between a latest SVR_TOKEN and SVR_TOKEN−1, the server may send change value that describes a difference between the latest SVR_TOKEN and SVR_TOKEN−M. In this case, there may be M number of token changes, and corresponding software upgrade information may be sent over the data channel. In the event that CLI_TOKEN is between SVR_TOKEN−M and SVR_TOKEN (including a wraparound case), then the device may utilize a push check-up protocol. Otherwise, the device may utilize a pull check-up protocol.

According to yet another aspect, there are two manners in which to download a software upgrade: (1) point-to-point and (2) multicast. For point-to-point implementations, after a user's approval, each device may create a point-to-point connection with the server and download the updated software application. For multicast, the server may multicast the upgraded application for a given time period (e.g., 1 week, 30 days, . . . ). Thus, depending on the download protocol, the software upgrade notification message in the data channel may have additional fields. For example, a "NOTIFICATION_DELAY" field can be added to the message if a point-to-point download mechanism is utilized. The device may generate a random number between 0 and a value of NOTIFICATION_DELAY, and can notify the user of a need for software upgrade after the chosen random time. This parameter facilitates delivering upgrade notification records to devices simultaneously. If an automatic download mechanism is employed after a user's permission, a surge of download requests may overwhelm download sites. Additionally, "CONTACT_WINDOW" field may be added to the message if multicast is used for application update download, which may indicate when to tune in to a broadcast channel to download the upgraded application.

Figure 6:
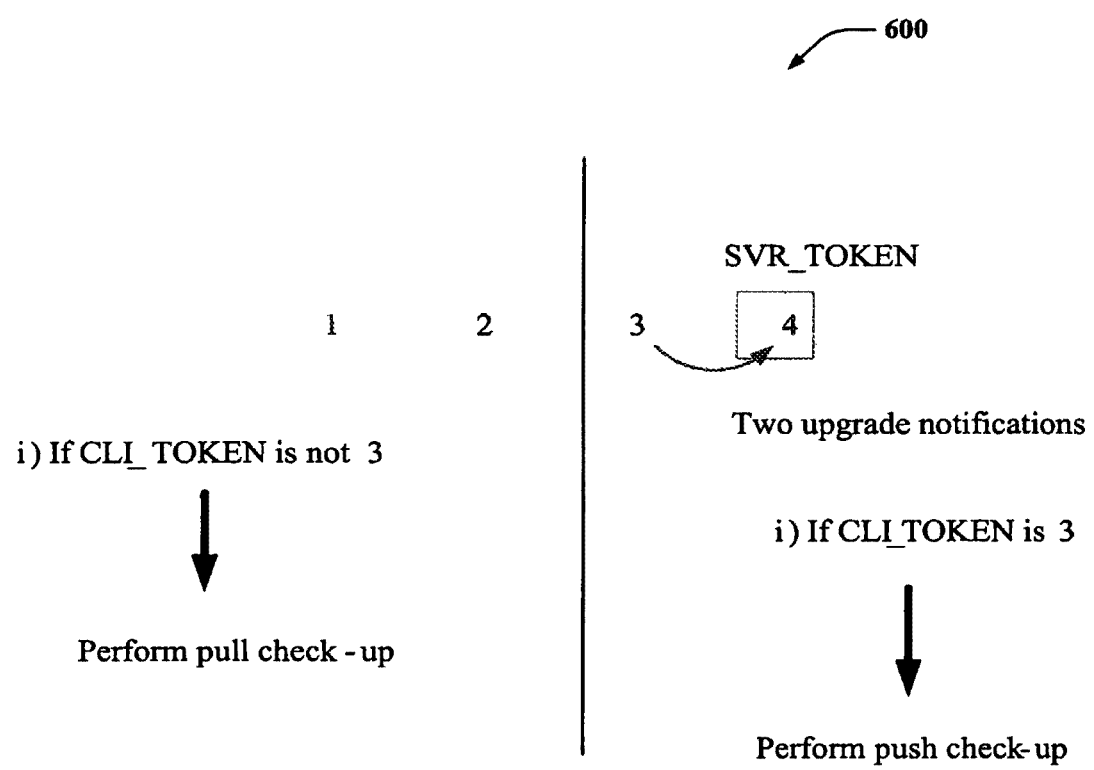
FIG. 6 is an illustration of a software upgrade notification scenario in which one or more check-up protocols may be performed, in accordance with a variety of aspects.

FIG. 6 is an illustration of a software upgrade notification scenario 600 in which one or more check-up protocols may be performed, in accordance with a variety of aspects. According to the scenario, a server token has been upgraded from 3 to 4, as indicated by the arrow from 3 to 4 in the figure. It may be assumed that there are two new upgrades for software classes A and B, and the server may advertise the SVR_TOKEN in an overhead channel. The server may then send two software upgrade notification messages in a data channel, utilizing a push check-up protocol if the client token value is equal to 3. The client may request an upgrade notification using a pull check-up protocol if the client token value is not equal to 3.

Figure 7:
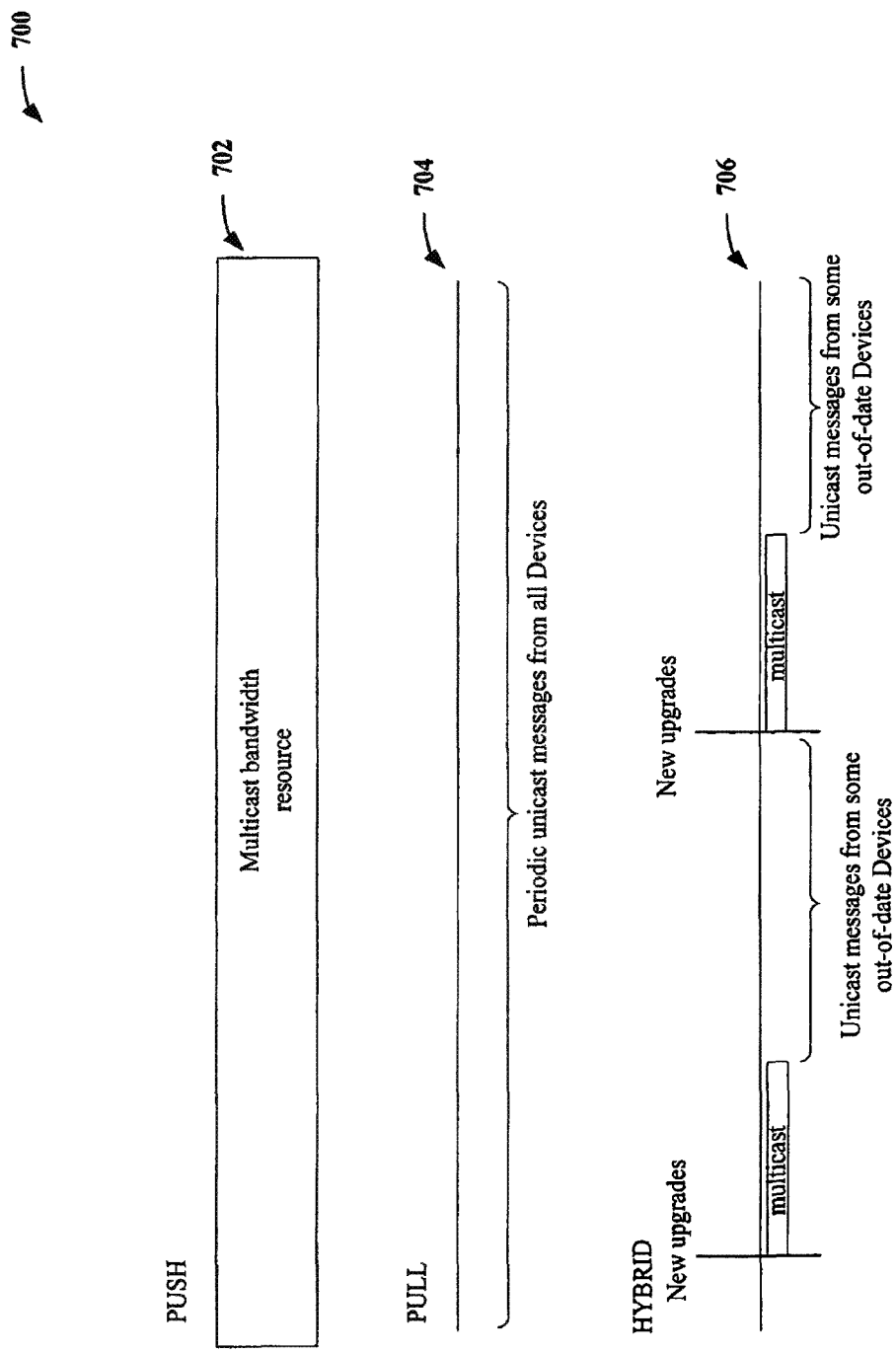
FIG. 7 is an illustration of a system a conceptual overview of a push method, a pull method, and a hybrid check-up method with token access.

FIG. 7 is an illustration of a system 700 a conceptual overview of a push method 702, a pull method 704, and a hybrid check-up method 706 with token access. According to various aspects, a hybrid approach using both push and pull check-up protocol is described. In cases where software upgrade events do not occur frequently, an amount of broadcast data related to only a most recent incremental change will be relatively small, which can conserve broadcast resources. Additionally, the hybrid protocol delivers instant upgrade notifications to devices connected to a network. Moreover, the time period between SVR_TOKEN change is likely to be large. Accordingly, most devices may be synchronized with the SVR_TOKEN value and only a few of may require a pull mechanism to be up-to-date, which in turn conserves unicast resources.

Depending on the importance of an upgrade compared to a previous upgrade, there are multiple levels of software upgrade urgency (URGENCY_LEVEL) associated with each software upgrade. The level of software upgrade urgency information may be also added to the notification message. For example, from level 1 to 3, level 1 may be critical, level 2 may be moderate, and level 3 may be optional. Depending on the URGENCY_LEVEL, a device may behave in different manners. For instance, when an application is labeled level 1, a device may quit the application and force the user to download the new software upgrade in order to protect the device from harm.

Figure 8:
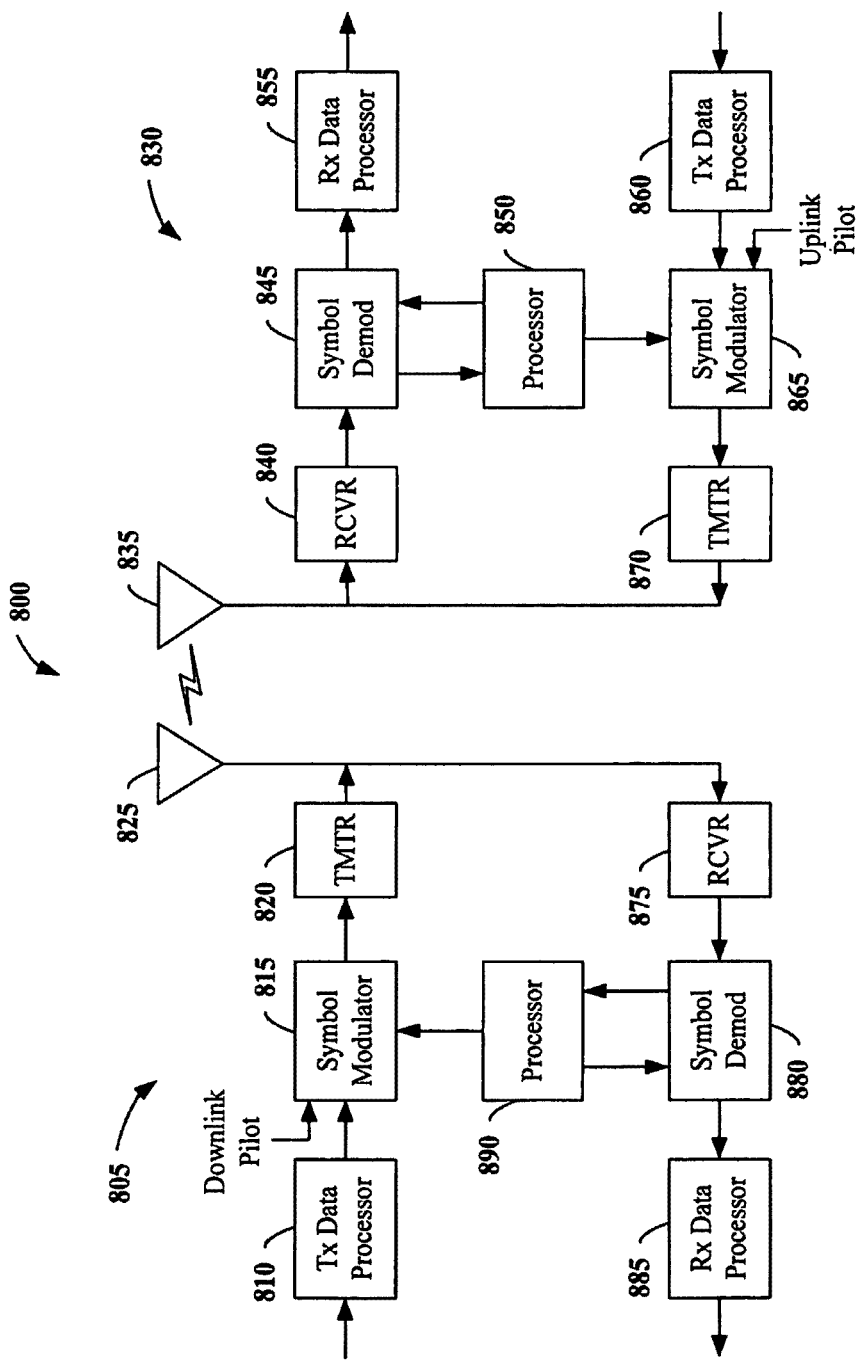
FIG. 8 is an illustration of a wireless network environment that can be employed in conjunction with the various systems and methods described herein.

FIG. 8 shows an exemplary wireless communication system 800. The wireless communication system 800 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1, 6, 7, and 9-12) and/or methods (FIGS. 2-5) described herein to facilitate wireless communication there between.

Referring now to FIG. 8, on a downlink, at access point 805, a transmit (TX) data processor 810 receives, formats, codes, interleaves, and modulates (or symbol maps) traffic data and provides modulation symbols ("data symbols"). A symbol modulator 815 receives and processes the data symbols and pilot symbols and provides a stream of symbols. A symbol modulator 820 multiplexes data and pilot symbols and provides them to a transmitter unit (TMTR) 820. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 820 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 825 to the terminals. At terminal 830, an antenna 835 receives the downlink signal and provides a received signal to a receiver unit (RCVR) 840. Receiver unit 840 conditions (e.g., filters, amplifies, and frequency downconverts) the received signal and digitizes the conditioned signal to obtain samples. A symbol demodulator 845 demodulates and provides received pilot symbols to a processor 850 for channel estimation. Symbol demodulator 845 further receives a frequency response estimate for the downlink from processor 850, performs data demodulation on the received data symbols to obtain data symbol estimates (which are estimates of the transmitted data symbols), and provides the data symbol estimates to an RX data processor 855, which demodulates (i.e., symbol demaps), deinterleaves, and decodes the data symbol estimates to recover the transmitted traffic data. The processing by symbol demodulator 845 and RX data processor 855 is complementary to the processing by symbol modulator 815 and TX data processor 810, respectively, at access point 805.

On the uplink, a TX data processor 860 processes traffic data and provides data symbols. A symbol modulator 865 receives and multiplexes the data symbols with pilot symbols, performs modulation, and provides a stream of symbols. A transmitter unit 870 then receives and processes the stream of symbols to generate an uplink signal, which is transmitted by the antenna 835 to the access point 805.

At access point 805, the uplink signal from terminal 830 is received by the antenna 825 and processed by a receiver unit 875 to obtain samples. A symbol demodulator 880 then processes the samples and provides received pilot symbols and data symbol estimates for the uplink. An RX data processor 885 processes the data symbol estimates to recover the traffic data transmitted by terminal 830. A processor 890 performs channel estimation for each active terminal transmitting on the uplink. Multiple terminals may transmit pilot concurrently on the uplink on their respective assigned sets of pilot subbands, where the pilot subband sets may be interlaced.

Processors 890 and 850 direct (e.g., control, coordinate, manage, etc.) operation at access point 805 and terminal 830, respectively. Respective processors 890 and 850 can be associated with memory units (not shown) that store program codes and data. Processors 890 and 850 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 890 and 850.

Figure 9:
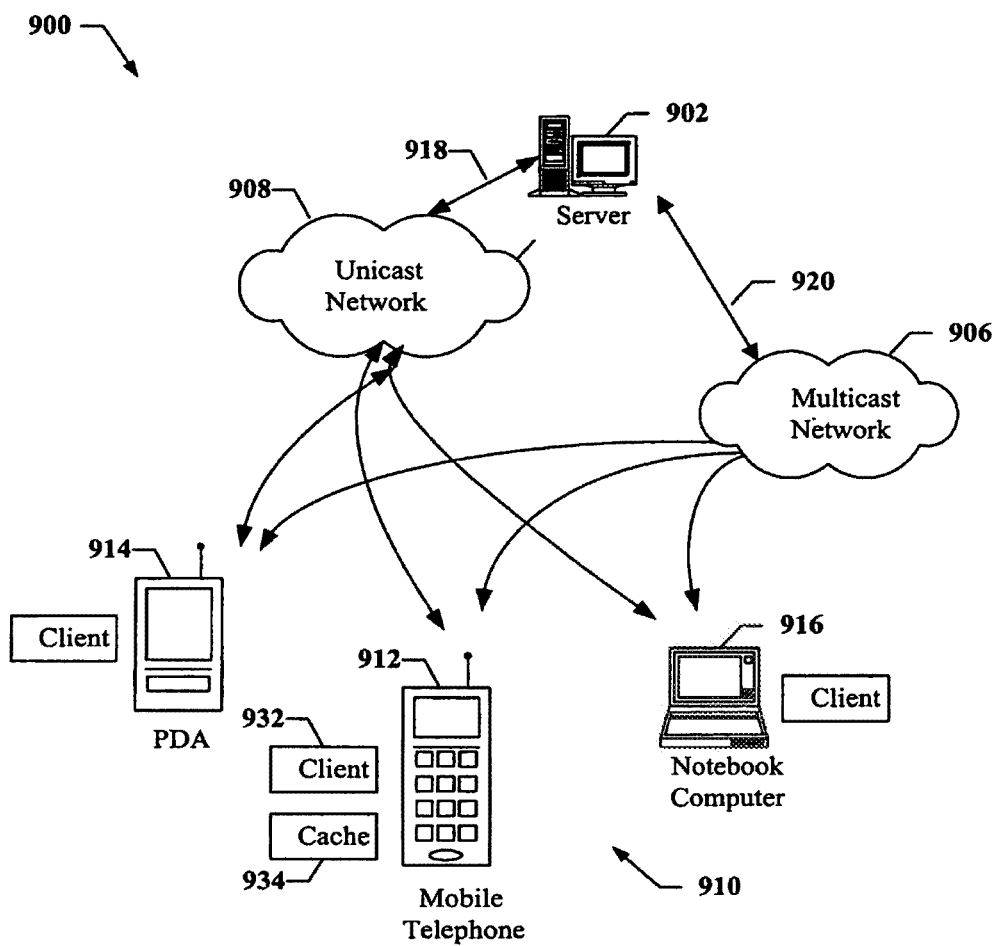
FIG. 9 illustrates a communication network that comprises a transport system that operates to create and transport multimedia content flows across data networks, in accordance with various aspects.

FIG. 9 illustrates a communication network 900 that comprises a transport system that operates to create and transport multimedia content flows across data networks, in accordance with various aspects. For example, the transport system is suitable for use in transporting content clips from a server network to a wireless access network for broadcast distribution. The network 900 comprises a server 902, an multicast network 906, and a wireless access network 908. The network 900 also includes devices 910 that comprise a mobile telephone 912, a personal digital assistance (PDA) 914, and a notebook computer 916. The devices 910 illustrate just some of the devices that are suitable for use in one or more aspects of the transport system. It should be noted that although three devices are shown in FIG. 9, virtually any number of devices, or types of devices are suitable for use in the transport system.

The server 902 operates to provide content for distribution to users in the network 900. The content comprises video, audio, multimedia content, clips, real-time and non real-time content, scripts, programs, data or any other type of suitable content. The server 902 provides the content to the multicast network 906 and/or the unicast network 908 for distribution. For example the server 902 communicates with the unicast network 908 via the communication link 918, which comprises any suitable type of wired and/or wireless communication link.

The network 900 comprises any combination of wired and wireless networks that operate to distribute content for delivery to users. The server 902 communicates with the multicast network 906 via the link 920. The link 920 comprises any suitable type of wired and/or wireless communication link. The multicast network 906 comprises any combination of wired and wireless networks that are designed to broadcast high quality content. For example, the multicast network 906 may be a specialized proprietary network that has been optimized to deliver high quality content to selected devices over a plurality of optimized communication channels.

In one or more aspects, the transport system operates to deliver content from the server 902 through the multicast network 906 and the unicast network 908, to the devices 910. For example, content flow may comprise a non real-time content clip that was provided by the server 902 for distribution using the multicast network 906. In one aspect, the server 902 operates to negotiate with the multicast network 906 to determine one or more parameters associated with the content clip. Once the multicast network 906 receives the content clip, it broadcasts/multicasts the content clip over the network 900 for reception by one or more of the devices 910. Any of the devices 910 may be authorized to receive the content clip and cache it for later viewing by the device user.

For example, the device 910 comprises a client program 932 that operates to provide a program guide that displays a listing of content that is scheduled for broadcast over the network 900. The device user may then select to receive any particular content for rendering in real-time or to be stored in a cache 934 for later viewing. For example the content clip may be scheduled for broadcast during the evening hours, and the device 912 operates to receive the broadcast and cache the content clip in the cache 934 so that the device user may view the clip the next day. Typically, the content is broadcast as part of a subscription service and the receiving device may need to provide a key or otherwise authenticate itself to receive the broadcast.

Figure 10:
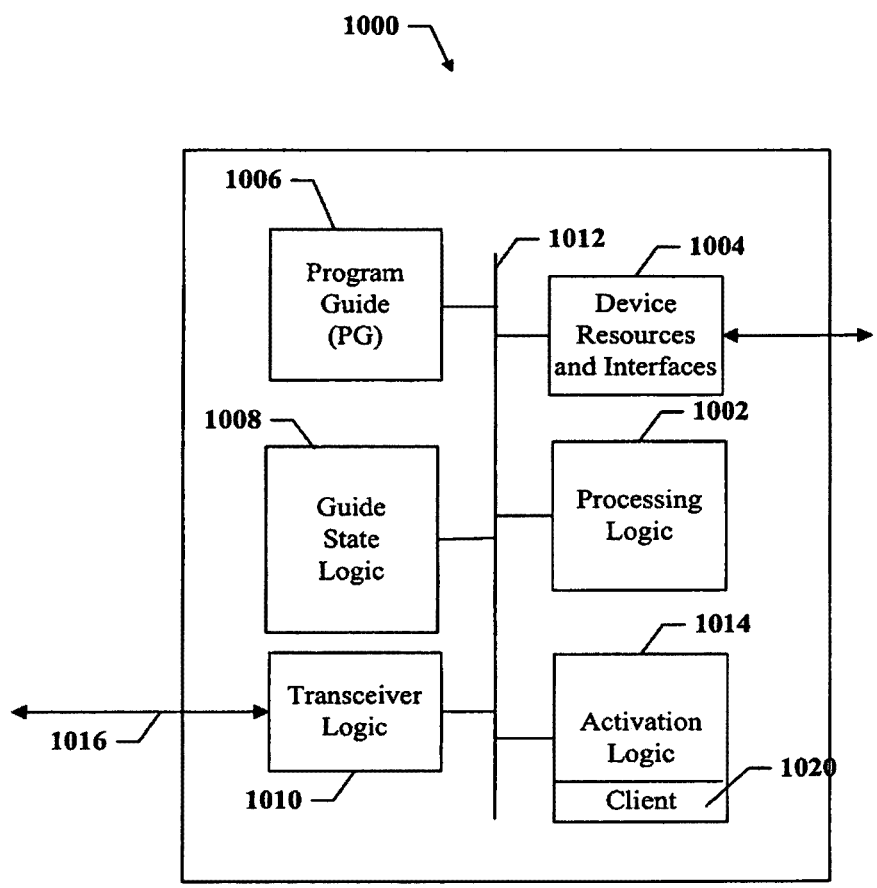
FIG. 10 illustrates various aspects of a content provider server suitable for use in a content delivery system.

FIG. 10 illustrates various aspects of a content provider server 1000 suitable for use in a content delivery system. For example, the server 1000 may be used as the server 902 in FIG. 9. The server 1000 comprises processing logic 1002, resources and interfaces 1004, and transceiver logic 1010, all coupled to an internal data bus 1012. The server 1000 also comprises activation logic 1014, PG 1006, and PG records logic 1008, which are also coupled to the data bus 1012. In one or more aspects, the processing logic 1002 comprises a CPU, processor, gate array, hardware logic, memory elements, virtual machine, software, and/or any combination of hardware and software. Thus, the processing logic 1002 generally comprises logic to execute machine-readable instructions and to control one or more other functional elements of the server 1000 via the internal data bus 1012.

The resources and interfaces 1004 comprise hardware and/or software that allow the server 1000 to communicate with internal and external systems. For example, the internal systems may include mass storage systems, memory, display driver, modem, or other internal device resources. The external systems may include user interface devices, printers, disk drives, or other local devices or systems. The transceiver logic 1010 comprises hardware logic and/or software that operates to allow the server 1000 to transmit and receive data and/or other information with remote devices or systems using communication channel 1016. For example, in one aspect, the communication channel 1016 comprises any suitable type of communication link to allow the server 1000 to communicate with a data network.

The activation logic 1014 comprises a CPU, processor, gate array, hardware logic, memory elements, virtual machine, software, and/or any combination of hardware and software. The activation logic 1014 operates to activate a server and/or a device to allow the server and/or the device to select and receive content and/or services described in the PG 1006. In one aspect, the activation logic 1014 transmits a client program 1020 to the server and/or the device during the activation process. The client program 1020 runs on the server and/or the device to receive the PG 1006 and display information about available content or services to the device user. Thus, the activation logic 1014 operates to authenticate a server and/or a device, download the client 1020, and download the PG 1006 for rendering on the device by the client 1020.

The PG 1006 comprises information in any suitable format that describes content and/or services that are available for devices to receive. For example, the PG 1006 may be stored in a local memory of the server 1000 and may comprise information such as content or service identifiers, scheduling information, pricing, and/or any other type of relevant information. In one aspect, the PG 1006 comprises one or more identifiable sections that are updated by the processing logic 1002 as changes are made to the available content or services.

The PG record 1008 comprises hardware and/or software that operates to generate notification messages that identify and/or describe changes to the PG 1006. For example, when the processing logic 1002 updates the PG 1006, the PG records logic 1008 is notified about the changes. The PG records logic 1008 then generates one or more notification messages that are transmitted to servers, which may have been activated with the server 1000, so that these servers are promptly notified about the changes to the PG 1006.

In various aspects, as part of the content delivery notification message, a broadcast indicator is provided that indicates when a section of the PG identified in the message will be broadcast. For example, in one aspect, the broadcast indicator comprises one bit to indicate that the section will be broadcast and a time indicator that indicates when the broadcast will occur. Thus, the servers and/or the devices wishing to update their local copy of the PG records can listen for the broadcast at the designated time to receive the updated section of the PG records. In one aspect, the content delivery notification system comprises program instructions stored on a computer-readable media, which when executed by a processor, for instance, the processing logic 1002, provides the functions of the server 1000 described herein. For example, the program instructions may be loaded into the server 1000 from a computer-readable media, such as a floppy disk, CDROM, memory card, FLASH memory device, RAM, ROM, or any other type of memory device or computer-readable media that interfaces to the server 1000 through the resources 1004. In another aspect, the instructions may be downloaded into the server 1000 from an external device or network resource that interfaces to the server 1000 through the transceiver logic 1010. The program instructions, when executed by the processing logic 1002, provide one or more aspects of a guide state notification system as described herein.

Figure 11:
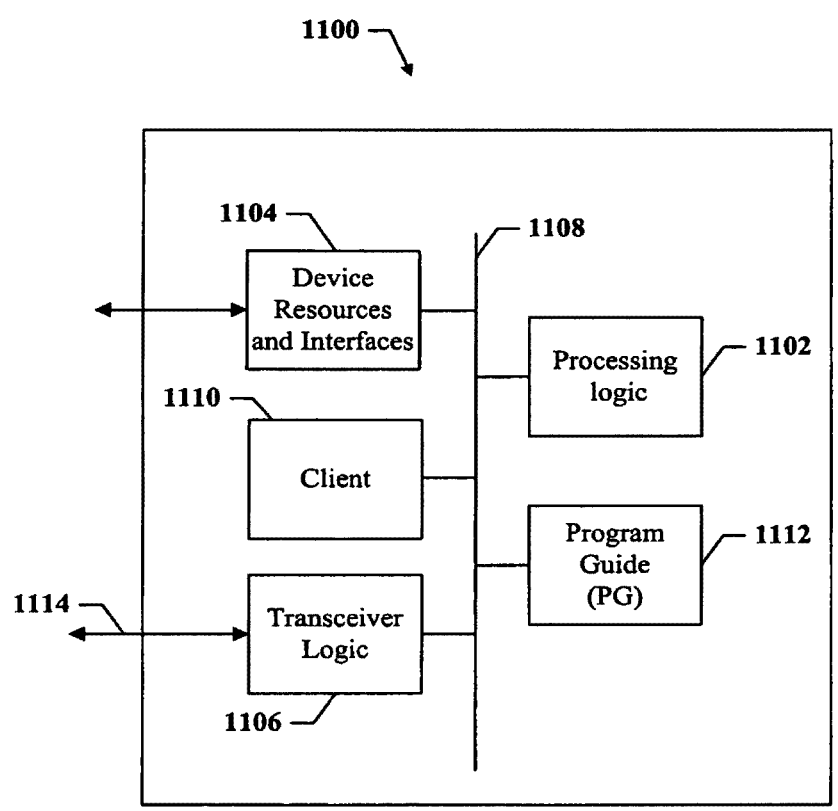
FIG. 11 illustrates a server or device suitable for use in a content delivery system, in accordance with one or more aspects

FIG. 11 illustrates a server or device 1100 suitable for use in a content delivery system, in accordance with one or more aspects. For example, server 1100 may be the server 902 or the device 910 shown in FIG. 9. The server 1100 comprises processing logic 1102, resources and interfaces 1104, and transceiver logic 1106, all coupled to a data bus 1108. The server 1100 also comprises a client 1110, a program logic 1114 and a PG logic 1112, which are also coupled to the data bus 1108. In one or more aspects, the processing logic 1102 comprises a CPU, processor, gate array, hardware logic, memory elements, virtual machine, software, and/or any combination of hardware and software. Thus, the processing logic 1102 generally comprises logic configured to execute machine-readable instructions and to control one or more other functional elements of the server 1100 via the internal data bus 1108.

The resources and interfaces 1104 comprise hardware and/or software that allow the server 1100 to communicate with internal and external systems. For example, internal systems may include mass storage systems, memory, display driver, modem, or other internal device resources. The external systems may include user interface devices, printers, disk drives, or other local devices or systems. The transceiver logic 1106 comprises hardware and/or software that operate to allow the server 1100 to transmit and receive data and/or other information with external devices or systems through communication channel 1114. For example the communication channel 1114 may comprise a network communication link, a wireless communication link, or any other type of communication link.

During operation, the server and/or the device 1100 is activated so that it may receive available content or services over a data network. For example, in one aspect, the server and/or the device 1100 identifies itself to a content provider server during an activation process. As part of the activation process, the server and/or the device 1100 receives and stores PG records by PG logic 1112. The PG 1112 contains information that identifies content or services available for the server 1100 to receive. The client 1110 operates to render information in the PG logic 1112 on the server and/or the device 1100 using the resources and interfaces 1104. For example, the client 1110 renders information in the PG logic 1112 on a display screen that is part of the device. The client 1110 also receives user input through the resources and interfaces so that a device user may select content or services.

In some aspects, the server 1100 receives notification messages through the transceiver logic 1106. For example, the messages may be broadcast or unicast to the server 1100 and received by the transceiver logic 1106. The PG notification messages identify updates to the PG records at the PG logic 1112. In one aspect, the client 1110 processes the PG notification messages to determine whether the local copy at the PG logic 1112 needs to be updated. For example, in one aspect, the notification messages include a section identifier, start time, end time, and version number. The server 1100 operates to compare the information in the PG notification messages to locally stored information at the existing PG logic 1112. If the server 1100 determines from the PG notification messages that one or more sections of the local copy at the PG logic 1112 needs to be updated, the server 1100 operates to receive the updated sections of the PG in one of several ways. For example, the updated sections of the PG may be broadcasted at a time indicated in the PG notification messages, so that the transceiver logic 1106 may receive the broadcasts and pass the updated sections to the server 1100, which in turn updates the local copy at the PG logic 1112.

In other aspects, the server 1100 determines which sections of the PG need to be updated based on the received PG update notification messages, and transmits a request to a CP server to obtain the desired updated sections of the PG. For example, the request may be formatted using any suitable format and comprise information such as a requesting server identifier, section identifier, version number, and/or any other suitable information. In one aspect, the server 1100 performs one or more of the following functions in one or more aspects of a PG notification system. It should be noted that the following functions might be changed, rearranged, modified, added to, deleted, or otherwise adjusted within the scope of the aspects. The server may be activated for operation with a content provider system to receive content or services. As part of the activation process, a client and PG are transmitted to the server. One or more PG notification messages may be received by the server and used to determine if one or more sections of the locally stored PG need to be updated. In one aspect, if the server determines that one or more sections of the locally stored PG need to be updated, the server listens to a broadcast from the distribution system to obtain the updated sections of the PG that it needs to update its local copy. In another aspect, the server transmits one or more request messages to the CP to obtain the updated sections of the PG it needs. In response to the request, the CP transmits the updated sections of the PG to the server. The server uses the received updated sections of the PG to update its local copy of the PG.

According to still other aspects, the content delivery system comprises program instructions stored on a computer-readable media, which when executed by a processor, such as the processing logic 1102, provides the functions of the content delivery notification system as described herein. For example, instructions may be loaded into the server 1100 from a computer-readable media, such as a floppy disk, CDROM, memory card, FLASH memory device, RAM, ROM, or any other type of memory device or computer-readable media that interfaces to the server 1100 through the resources and interfaces 1104. In another aspect, the instructions may be downloaded into the server 1100 from a network resource that interfaces to the server 1100 through the transceiver logic 1106. The instructions, when executed by the processing logic 1102, provide one or more aspects of a content delivery system as described herein. It should be noted that the server 1100 represents just one implementation and that other implementations are possible within the scope of the aspects.

Figure 12:
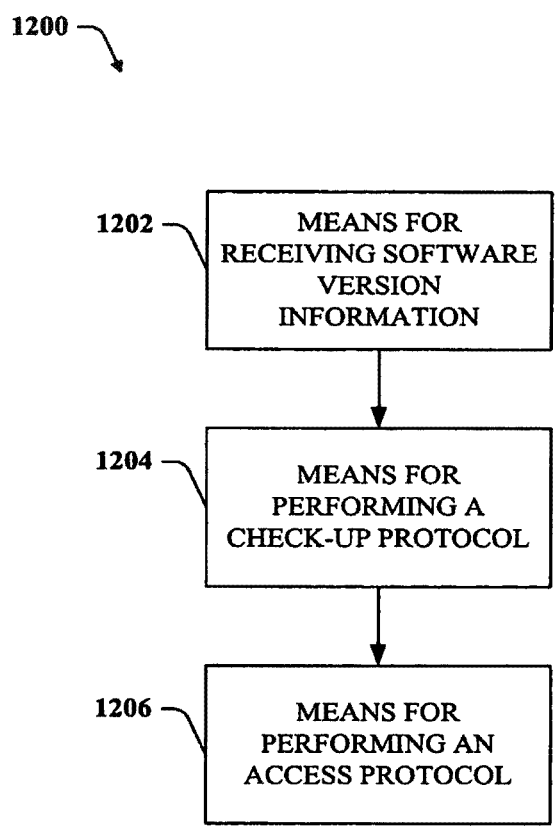
FIG. 12 is an illustration of an apparatus that facilitates performing a check-up protocol and an access protocol in a wireless communication environment, in accordance with various aspects.

FIG. 12 is an illustration of an apparatus 1200 that facilitates performing a check-up protocol and an access protocol in a wireless communication environment, in accordance with various aspects. Apparatus 1200 may comprise means for receiving 1202 software version information, such as a sequence number and/or software ID associated with a class of software. The apparatus further comprises means for performing a checkup-protocol 1204, which may perform either a push check-up protocol or a pull check-up protocol, or both, depending on certain conditions (e.g., such as described above with regard to FIGS. 2 and 3). The apparatus 1200 still further comprises means for performing an access protocol to facilitate determining whether an upgrade notification is required. Means for performing an access protocol 1206 may perform a periodic protocol that is executed at predetermined intervals, a launch-initiated protocol that is executed each time the software launches, a user-initiated protocol that is executed upon a user command, a transaction-based protocol that is initiated upon a transaction between the client and a server, etc. Additionally, the means for performing an access protocol 1206 may perform a token access protocol, such as is described in detail with regard to FIGS. 4 and 5. In this manner, apparatus 1200 can facilitate determining whether software on a user device is up to date or whether a software upgrade notification is required for the device.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method implemented on a server for providing software upgrades, the method comprising:
transmitting a software upgrade notification on a data channel, the software upgrade notification including one or more server tokens associated with m most recent software upgrades available on the server, where m is an integer;
performing a push protocol to provide the m most recent software upgrades indicated in the software upgrade notification; and
providing a software upgrade not indicated in the software upgrade notification responsive to a pull protocol from a client device.

2. The method of claim 1, wherein the push protocol is performed over a multicast connection between the server and at least one client device.

3. The method of claim 2, further comprising transmitting software version information over the multicast connection.

4. The method of claim 3, further comprising transmitting a software ID with the software version information corresponding to the at least one client device.

5. The method of claim 1, wherein providing the software upgrade further comprises generating a point-to-point connection between the server and the client device.

6. The method of claim 5, further comprising receiving a software upgrade information request from the client device.

7. The method of claim 1, further comprising:
transmitting a software version information on an overhead channel.

8. The method of claim 7, further comprising:
sending incremental software change information for two or more software classes by advertising a token value common to the two or more software classes in the overhead channel and sending software upgrade notification messages for the two or more software classes in the data channel.

9. An apparatus that facilitates providing software upgrades, comprising:
a transmitter operable to transmit a software upgrade notification on a data channel, the software upgrade notification including one or more server tokens associated with m most recent software upgrades available on the server, where m is an integer; and
a processor operable to:
perform a push protocol to provide the m most recent software upgrades indicated in the software upgrade notification; and
provide a software upgrade not indicated in the software upgrade notification responsive to a pull protocol from a client device.

10. The apparatus of claim 9, wherein the push protocol is performed over a multicast connection between the server and at least one client device.

11. The apparatus of claim 10, wherein the transmitter is further operable to transmit software version information over the multicast connection.

12. The apparatus of claim 11, wherein the transmitter is further operable to transmit a software ID with the software version information corresponding to the at least one client device.

13. The apparatus of claim 9, wherein the processor is further operable to provide the software upgrade by generating a point-to-point connection between the server and a client device.

14. The apparatus of claim 13, further comprising a receiver operable to receive a software upgrade information request from the client device.

15. The apparatus of claim 9, where the transmitter is further operable to:
transmit a software version information on an overhead channel.

16. The apparatus of claim 15, wherein the transmitter is further operable to:
send incremental software change information for two or more software classes by advertising a token value common to the two or more software classes in the overhead channel and sending software upgrade notification messages for the two or more software classes in the data channel.

17. A computer program product comprising a non-volatile computer-readable medium having a computer program stored thereon, the computer program comprising computer-executable instructions for:

transmitting a software upgrade notification on a data channel, the software upgrade notification including one or more server tokens associated with m most recent software upgrades available on the server, where m is an integer;

performing a push protocol to provide the m most recent software upgrades indicated in the software upgrade notification; and providing a software upgrade not indicated in the software upgrade notification responsive to a pull protocol from a client device.

18. The computer program product of claim 17, wherein the push protocol is performed over a multicast connection between the server and at least one client device.

19. The computer program product of claim 18, wherein the computer program further comprises computer-executable instructions for transmitting software version information over the multicast connection.

20. The computer program product of claim 19, wherein the computer program further comprises computer-executable instructions for transmitting a software ID with the software version information corresponding to the at least one client device.

21. The computer program product of claim 17, wherein the instructions for providing the software upgrade further comprise instructions for generating a point-to-point connection between the server and the client device.

22. The computer program product of claim 21, wherein the computer program further comprises computer-executable instructions for receiving a software upgrade information request from the client device.

23. The computer program product of claim 17, wherein the computer program further comprises computer-executable instructions for:

transmitting a software version information on an overhead channel.

24. The computer program product of claim 23, wherein the computer program further comprises computer-executable instructions for:

sending incremental software change information for two or more software classes by advertising a token value common to the two or more software classes in the overhead channel and sending software upgrade notification messages for the two or more software classes in the data channel.

25. A processor that executes instructions for providing a software upgrade in a wireless communication environment, the processor configured to:

transmit a software upgrade notification on a data channel, the software upgrade notification including one or more server tokens associated with m most recent software upgrades available on the server, where m is an integer;

perform a push protocol to provide the m most recent software upgrades indicated in the software upgrade notification; and provide a software upgrade not indicated in the software upgrade notification responsive to a pull protocol from a client device.

26. The processor of claim 25, wherein the push protocol is performed over a multicast connection between the server and at least one client device.

27. The processor of claim 26, further configured to:

transmit software version information over the multicast connection.

28. The processor of claim 27, further configured to:

transmit a software ID with the software version information corresponding to the at least one client device.

29. The processor of claim 25, further configured to:

provide the software upgrade by generating a point-to-point connection between the server and the client device.

30. The processor of claim 29, further configured to:

receive a software upgrade information request from the client device.

31. The processor of claim 25, further configured to:

transmit a software version information on an overhead channel.

32. The processor of claim 31, further configured to:

send incremental software change information for two or more software classes by advertising a token value common to the two or more software classes in the overhead channel and sending software upgrade notification messages for the two or more software classes in the data channel.

* * * * *